(12) United States Patent
Hsu

(10) Patent No.: US 6,272,827 B1
(45) Date of Patent: Aug. 14, 2001

(54) RAKE DEVICE HAVING GRIPPING AND RETRACTING MECHANISM

(76) Inventor: Shih Hao Hsu, No. 426, Dou Yuan East Road, Bi Tou Hsiang, Chang Hua Hsien (TW)

( * ) Notice: Subject to any disclaimer, the term of this patent is extended or adjusted under 35 U.S.C. 154(b) by 0 days.

(21) Appl. No.: 09/376,385

(22) Filed: Aug. 18, 1999

(51) Int. Cl.[7] .................................................. A01D 7/00
(52) U.S. Cl. ..................................... 56/400.12; 56/400.17
(58) Field of Search ........................... 56/400.01, 400.04, 56/400.12, 400.16, 400.17, 400.18, 400.2; 294/50.6, 50.8

(56) References Cited

U.S. PATENT DOCUMENTS

| 2,746,234 | * | 5/1956 | Utley | 56/400.19 |
| 3,601,966 | * | 8/1971 | Kerry | 56/400.12 |
| 4,378,671 | * | 4/1983 | Gascon | 56/400.12 |
| 5,303,536 | * | 4/1994 | Tolliver | 56/400.12 |
| 5,414,982 | | 5/1995 | Darnell | 56/400.19 |
| 5,440,868 | * | 8/1995 | Darnell | 56/400.17 |
| 5,553,447 | | 9/1996 | Hsu | 56/400.18 |
| 6,134,869 | * | 10/2000 | Barrett | 56/400.12 |

* cited by examiner

Primary Examiner—Robert E. Pezzuto
(74) Attorney, Agent, or Firm—Charles E. Baxley, Esq.

(57) ABSTRACT

A rake device includes a rake secured to the front end of a rod, and another rake pivotally secured to the rod at a lateral pivot shaft. The rakes may be rotated toward each other to grasp leaves and grass. One of the rakes includes one or more cams, and the other rake includes one or more actuators for engaging with the cams and for rotating the rakes toward each other. A frame is secured to the rod and having a number of apertures for receiving the tines of one of the rakes which is coupled to a handle that may move the tines relative to the frame to a folding position.

11 Claims, 6 Drawing Sheets

RAKE DEVICE HAVING GRIPPING AND RETRACTING MECHANISM

BACKGROUND OF THE INVENTION

1. Field of the Invention

The present invention relates to a rake, and more particularly to a garden or lawn rake device having a gripping and/or retracting mechanism.

2. Description of the Prior Art

The closest prior art of which the applicant is aware is his prior U.S. Pat. No. 5,553,447 to Hsu and comprises a number of tines that may be retracted to a folding or storing configuration. However, the rake may not be used to gripping the tree leaves and grass gathered by the rake.

The other typical rakes comprise two groups of tines symmetrically provided on the opposite lateral sides of the rod handle and movable into a generally mutual overlaying relationship for gripping the tree leaves and grass. However, a greatly complicated configuration is required for pivotally coupling the two groups of tines to the rod handle and for allowing the two groups of tines to be rotated about the rod handle to the overlaying relationship. One of the typical rakes is disclosed in U.S. Pat. No. 5,414,982 to Darnell.

The present invention has arisen to mitigate and/or obviate the afore-described disadvantages of the conventional rakes.

SUMMARY OF THE INVENTION

The primary objective of the present invention is to provide a rake device including an auxiliary tine device rotatable about a first rake for gripping the tree leaves and grass.

The other objective of the present invention is to provide a rake device in which the first rake includes a number of tines that may be expanded to an open and working position and that may be retracted to a folding and storing position.

In accordance with one aspect of the invention, there is provided a rake device comprising a rod including a front end, a first rake secured to the front end of the rod, a second rake pivotally secured to the front end of the rod at a pivot shaft, the pivot shaft being lateral relative to the rod, and means for rotating the second rake toward the first rake to grasp leaves and grass.

The second rake includes at least one cam provided thereon, the first rake includes a front portion and includes at least one first actuator provided thereon for engaging with the at least one cam and for rotating the second rake toward the front portion of the first rake to grasp leaves and grass. The first rake includes at least one tine having a depression formed therein for receiving the at least one cam and for allowing the second rake to be dependent downward relative to the first rake before the at least one first actuator is engaged with the at least one cam to rotate the second rake toward the first rake.

The depression of the first rake includes a first end having the at least one first actuator formed thereon and includes a second end having a second actuator formed thereon for engaging with the second rake and for rotating the second rake toward the rod at a folding position. A retaining device is further provided for retaining the second rake at the folding position and includes a catch slidably engaged on the rod and having at least one hook extended therefrom for engaging with and for retaining the second rake to the rod at the folding position. A projection is extended from the first rake to engage with the second rake and to rotate the second rake toward the rod before the catch is engaged with the second rake. The second rake includes an extension extended therefrom for engaging with the projection and for allowing the second rake to be further rotated toward the rod.

A frame is further secured to the first end of the rod, the second rake is pivotally secured to the frame at the pivot shaft. The first rake includes a plurality of tines, the frame includes a plurality of apertures formed therein for receiving the tines of the first rake. A handle is slidably engaged on the rod and secured to the first rake for allowing the handle to move the tines of the first rake relative to the frame. A latch is further provided for detachably securing the handle to the rod. A tube is secured between the handle and the first rake for adjusting a distance between the handle and the first rake.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
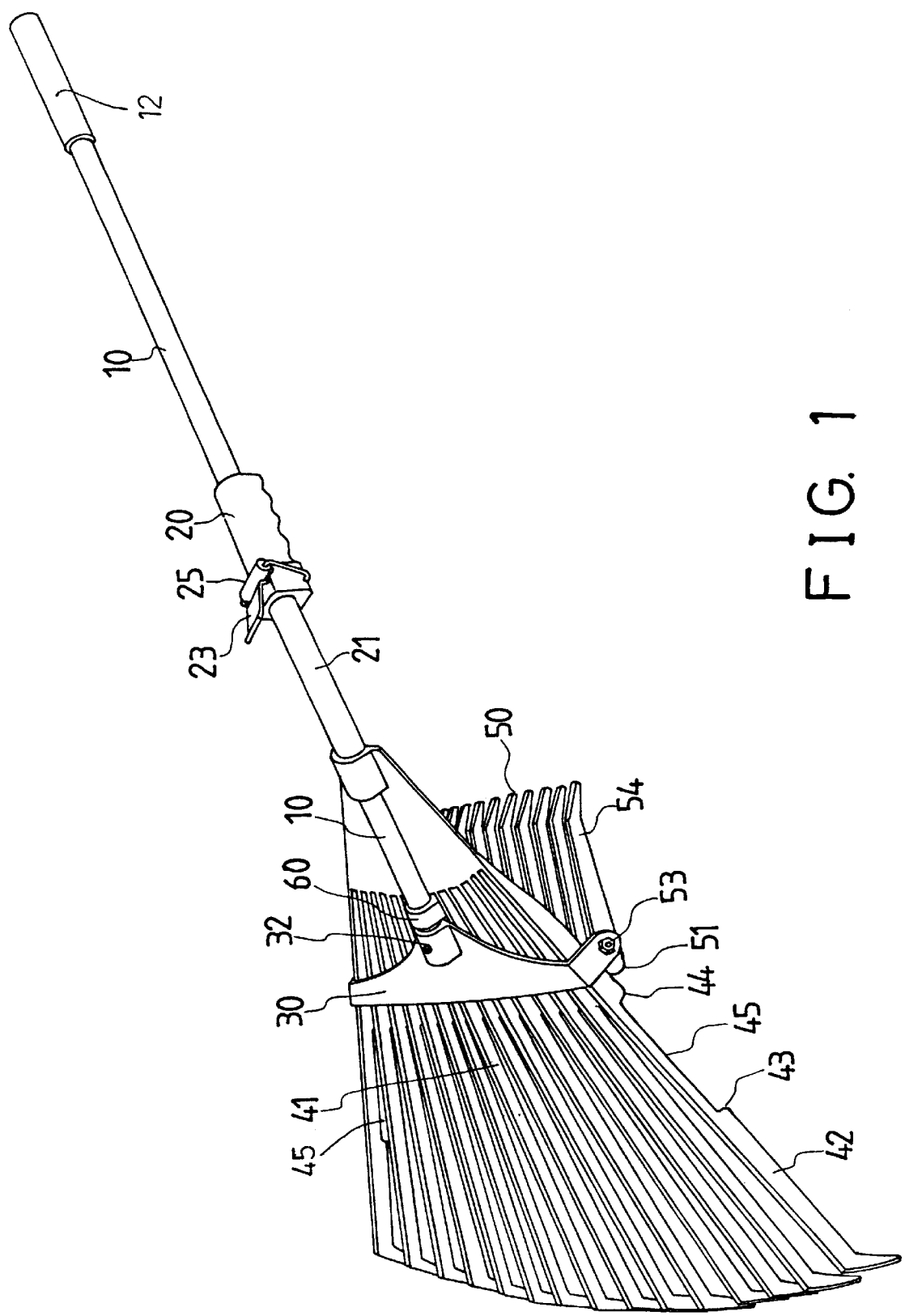
FIG. 1 is a perspective view of a rake device in accordance with the present invention.
Figure 2:
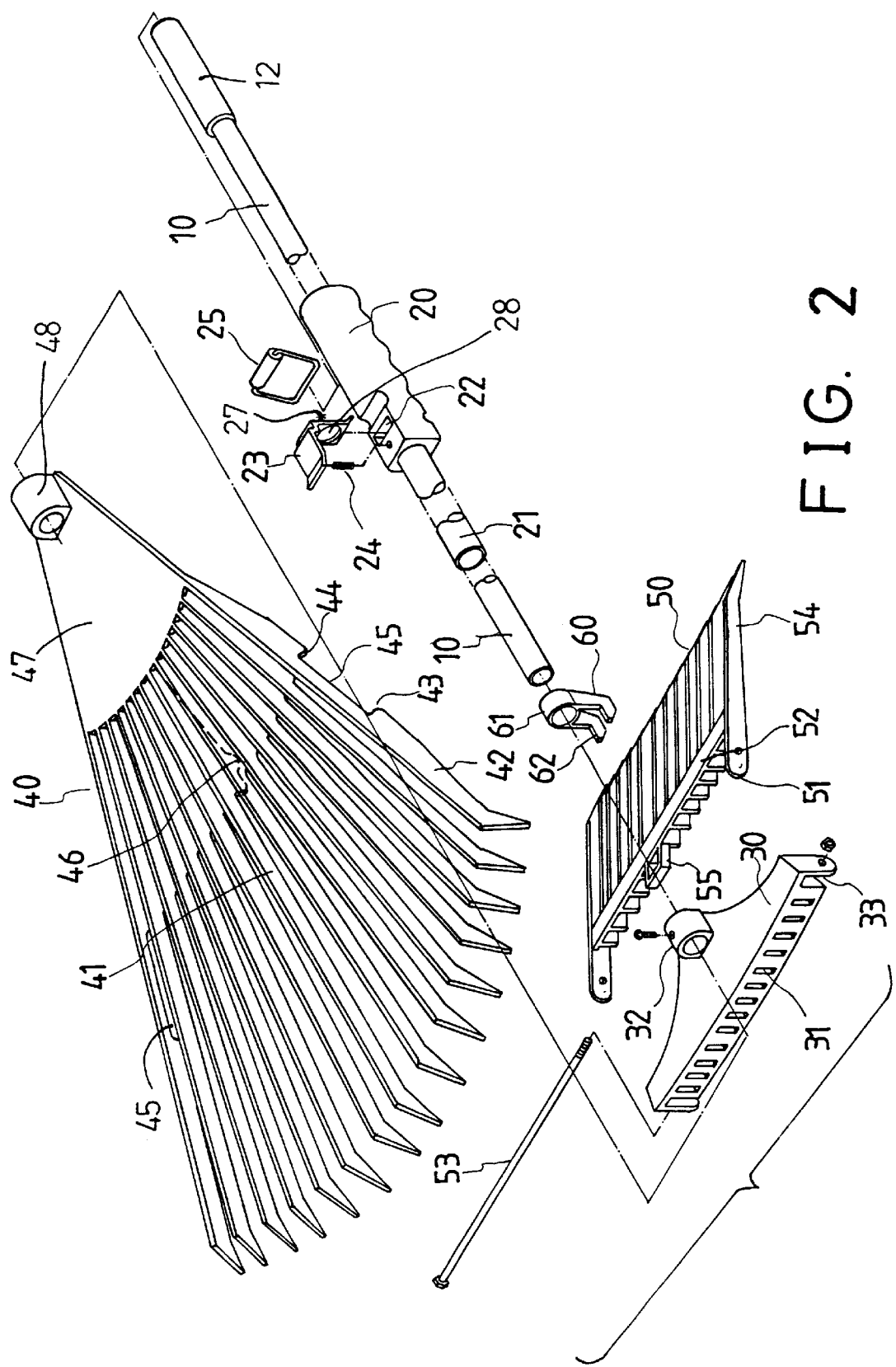
FIG. 2 is an exploded view of the rake device.
Figure 3:
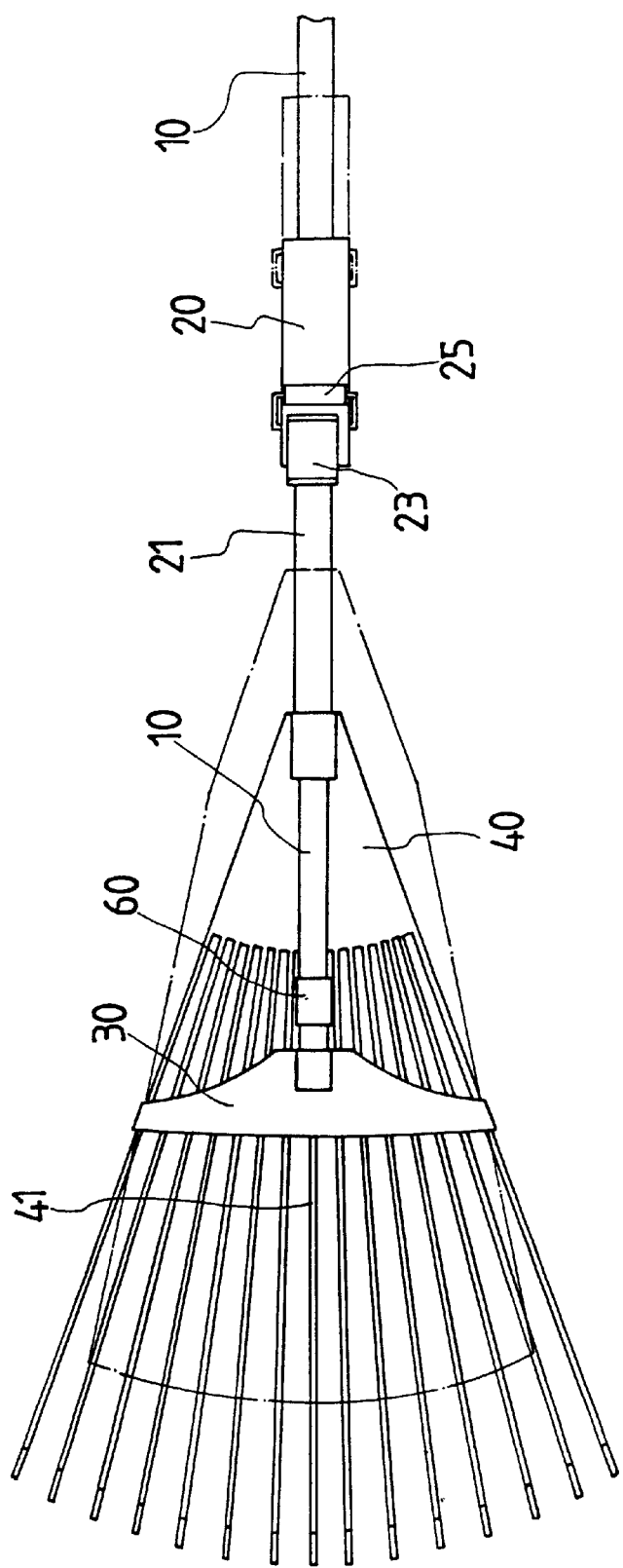
FIG. 3 is a top plane view illustrating the operation of the rake device.

Referring to the drawings, and initially to FIGS. 1–4, a rake device in accordance with the present invention comprises a longitudinal rod 10 including a hand grip 12 secured on the rear end thereof. A handle 20 and a tube 21 are secured together and are slidably engaged on the rod 10. The handle 20 includes a channel 22 formed therein. A latch 23 includes a panel 27 engaged into the channel 22 of the handle 20 and having an opening 28 formed therein for receiving the rod 10. A spring 24 is engaged between the handle 20 and the latch 23 for biasing the panel 27 of the latch 23 to engage with the rod 10 and to lock the rod 10 to the handle 20. The operation of the latch 23 is disclosed in the applicant's prior U.S. Pat. No. 5,553,447 which is taken as a reference for the present invention. A loop 25 is engaged on the handle 20 and may be selectively engaged with the latch 23 to disengage the panel 27 from the rod 10 (FIGS. 4, 6) for allowing the rod 10 to be freely slided in the handle 20.

A first rake 40 includes a number of tines 41 extended outward or forward from a base 47 in a substantially sector-shape, and includes a coupler 48 extended upward from the base 47 and secured to the front end of the tube 21 by such as fasteners or by welding processes such that the first rake 40 may be moved along the rod 10 by the handle 20. The first rake 40 may also be directly secured to the handle 20 and to be moved by the handle 20 without the tube 21. However, the provision of the tube 21 may adjust the distance between the handle 20 and the first rake 40 for allowing the user to easily move the handle 20 along the rod 10. Both of the sidemost tines 41 of the first rake 40 each includes a depression 45 formed in the bottom portion thereof and each includes two actuators 43, 44 formed in the ends of the depression 45. One of the tines 41 includes a projection 46 extended downward therefrom. A catch 60 includes a barrel 61 slidably engaged on the rod 10 and includes one or more hooks 62 extended downward beyond the tines 41 (FIGS. 4–6).

A frame 30 includes a hub 32 extended upward therefrom for receiving the front end of the rod 10 and for securing to the rod 10 by such as a fastener, and includes a number of apertures 31 formed therein for slidably receiving the tines 41 of the first rake 40, and includes one or both ends each having a notch 33 formed therein and communicating with the respective apertures 31. An second rake 50 is pivotally coupled to the front end of the rod 10 or to the frame 30 at a pivot shaft 53 which is arranged laterally relative to said rod 10, and preferably, but not necessarily be perpendicular to the rod 10. The second rake 50 includes a lateral beam 52 secured between two sidemost tines 54 and having an extension 55 extended therefrom for engaging with the projection 46 of the first rake 40. The engagement of the projection 46 with the extension 55 or the lateral beam 52 or the second rake 50 may further move the second rake 50 toward the rod 10 for allowing the hooks 62 of the catch 60 to be easily engaged with the beam 52 of the second rake 50. One or both of the sidemost tines 54 include a cam 51 formed in one end thereof for engaging with either of the actuators 43, 44 of the first rake 40.

Figure 4:
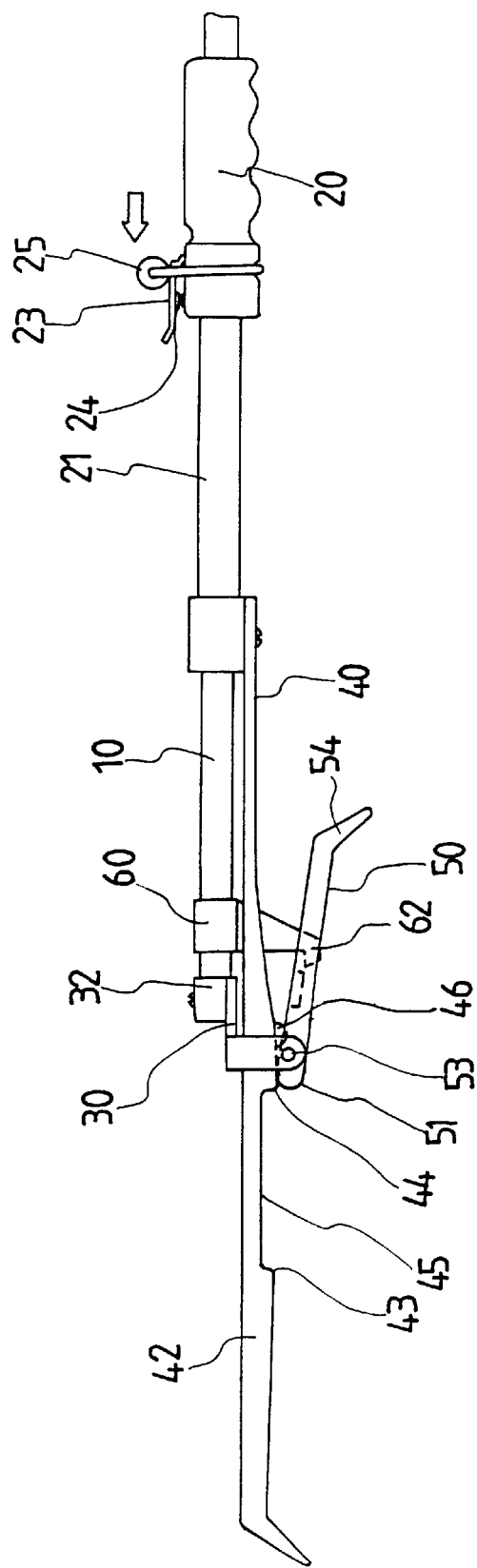
FIGS. 4, 5, 6 are side elevational views illustrating the operation of the rake device.

In operation, as shown in FIG. 4, when the first rake 40 is moved forward relative to the rod 10 and the frame 30 by the handle 20, the actuator(s) 44 of the first rake 40 may actuate the cam(s) 51 of the second rake 50 to rotate the second rake 50 away from the front portion 42 of the first rake 40 to a folding or storing position. The first rake 40 may thus be used to gather the leaves and grass. As shown in FIG. 6, when the first rake 40 is pulled and moved rearward relative to the rod 10 and when the cam 51 of the second rake 50 is received in the depression 45 of the tine 41, the second rake 50 may be dependent downward as shown in dotted lines. When the first rake 40 is further moved rearward relative to the rod 10, the actuator 43 of the first rake 40 may engage with the cam 51 of the second rake 50 and may rotate the second rake 50 toward the front portion 42 of the first rake 40 for gripping the tree leaves and grass.

Figure 5:
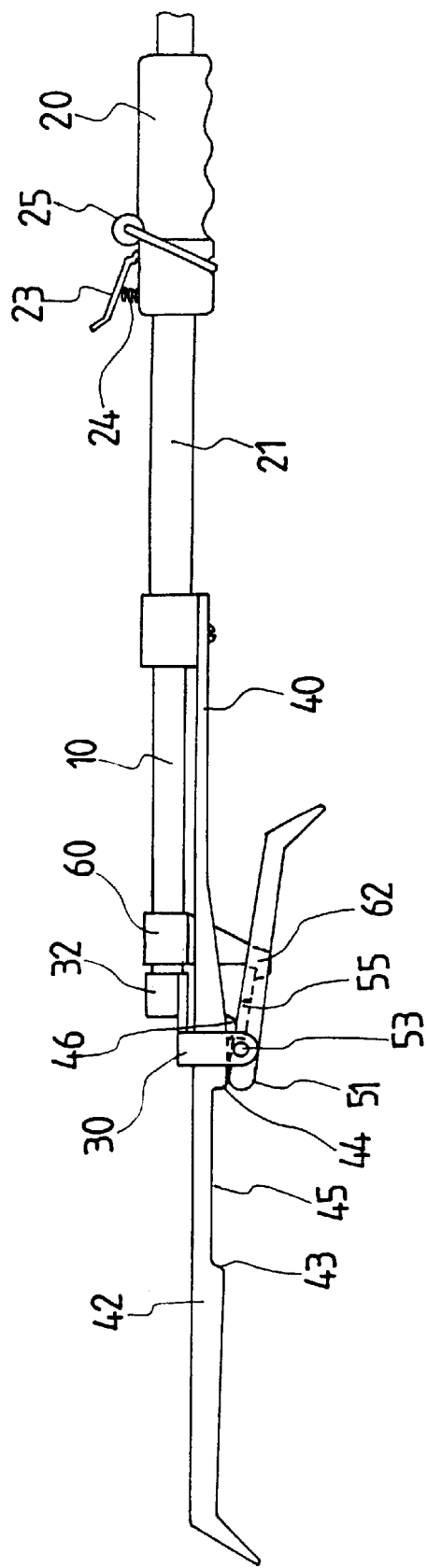
Figure 6:
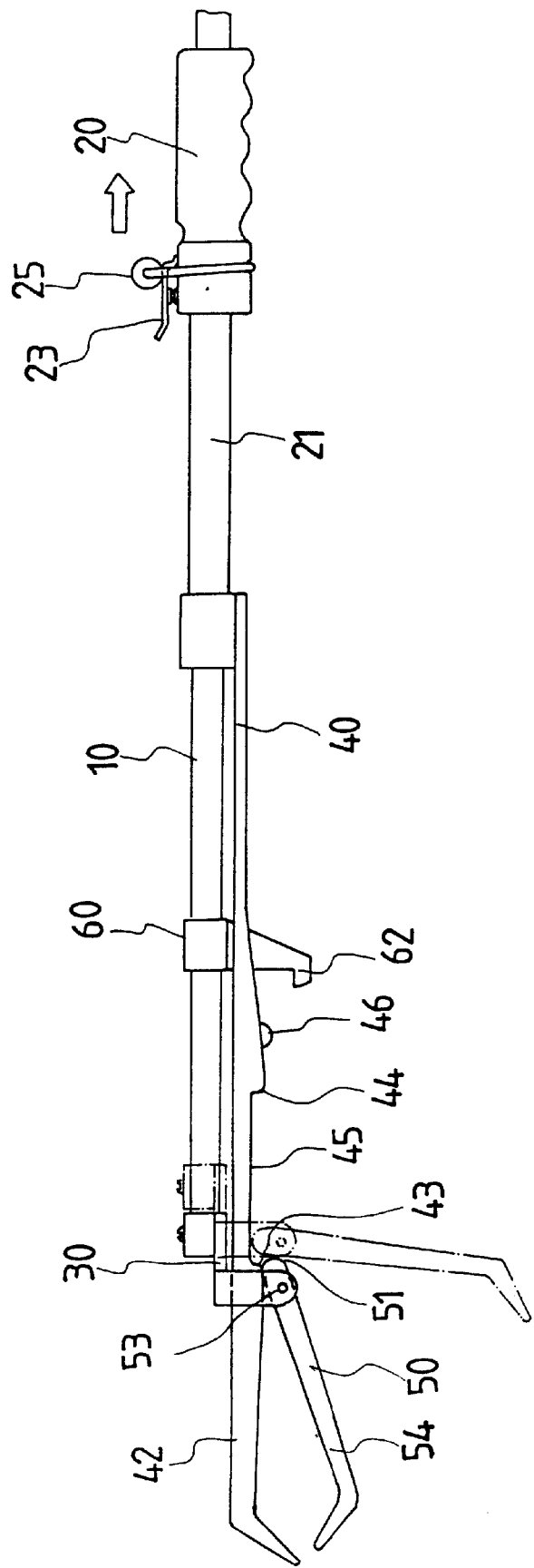

When the second rake 50 is rotated away from the front portion 42 of the first rake 40 to the folding position as shown in FIG. 4, the hook(s) of the catch 60 may then be moved forward to engage with the the beam 52 of the second rake 50 to secure the second rake 50 to the frame 30 or to the rod 10 at the folding position (FIG. 5). At this moment, the tines 41 of the first rake 40 may be moved relative to the frame 30 freely to a completely retracted or storing position, and the cams 51 of the second rake 50 will not be engaged in the depressions 45 of the first rake 40.

Although two depressions 45, two pairs of actuators 43, 44 and two cams 51 are shown in the drawings, an engagement of a single actuator 43 with a cam 51 is good enough to rotate the second rake 50 toward the front portion of the first rake 40. The cam 51 and the depression 45 are not required to be formed on the sidemost tines, but may be formed in the other tines.

Accordingly, the rake device in accordance with the present invention includes an second rake rotatable about a first rake for gripping the tree leaves and grass. The first rake includes a number of tines that may be expanded to an open and working position and that may be retracted to a folding and storing position.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A rake device comprising:
   a rod including a front end,
   a first rake secured to said front end of said rod, said first rake including a front portion and including at least one first actuator provided thereon, said first rake including at least one tine having a depression formed therein,
   a second rake pivotally secured to said front end of said rod at a pivot shaft, said pivot shaft being lateral relative to said rod, said second rake including at least one cam provided thereon, said at least one first actuator of said first rake being engaged with said at least one cam of said second rake for rotating said second rake toward said front portion of said first rake to grasp leaves and grass, said depression of said at least one tine of said first rake being provided for receiving said at least one cam of said second rake and for allowing said second rake to be dependent downward relative to said first rake before said at least one first actuator is engaged with said at least one cam to rotate said second rake toward said first rake, and
   means for rotating said second rake toward said first rake to grasp leaves and grass,
   wherein said depression of said first rake includes a first end having said at least one first actuator formed thereon and includes a second end having a second actuator formed thereon for engaging with said second rake and for rotating said second rake toward said rod at a folding position.

2. The rake device according to claim 1 further comprising means for retaining said second rake at said folding position.

3. The rake device according to claim 2, wherein said retaining means includes a catch slidably engaged on said rod and having at least one hook extended therefrom for engaging with and for retaining said second rake to said rod at said folding position.

4. The rake device according to claim 3 further comprising means for further rotating said second rake toward said rod before said catch is engaged with said second rake.

5. The rake device according to claim 6, wherein said further rotating means includes a projection extended from said first rake to engage with said second rake and to rotate said second rake toward said rod before said catch is engaged with said send rake.

6. The rake device according to claim 5, wherein said second rake includes an extension extended therefrom for engaging with said projection and for allowing said second rake to be further rotated toward said rod.

7. The rake device according to claim 1 further comprising a frame secured to said first end of said rod, said second rake being pivotally secured to said frame at said pivot shaft.

8. The rake device according to claim 7, wherein said first rake includes a plurality of tines, said frame includes a plurality of apertures formed therein for receiving said tines of said first rake.

9. The rake device according to claim 8 further comprising a handle slidably engaged on said rod and secured to said first rake for allowing said handle to move said tines of said first rake relative to said frame.

10. The rake device according to claim 9 further comprising means for detachably securing said handle to said rod.

11. The rake device according to claim 9 further comprising a tube secured between said handle and said first rake for adjusting a distance between said handle and said first rake.

* * * * *